Oct. 10, 1944.   J. MIHALYI   2,360,256
EXPOSURE CONTROLLING MECHANISM FOR CAMERAS
Filed June 6, 1942
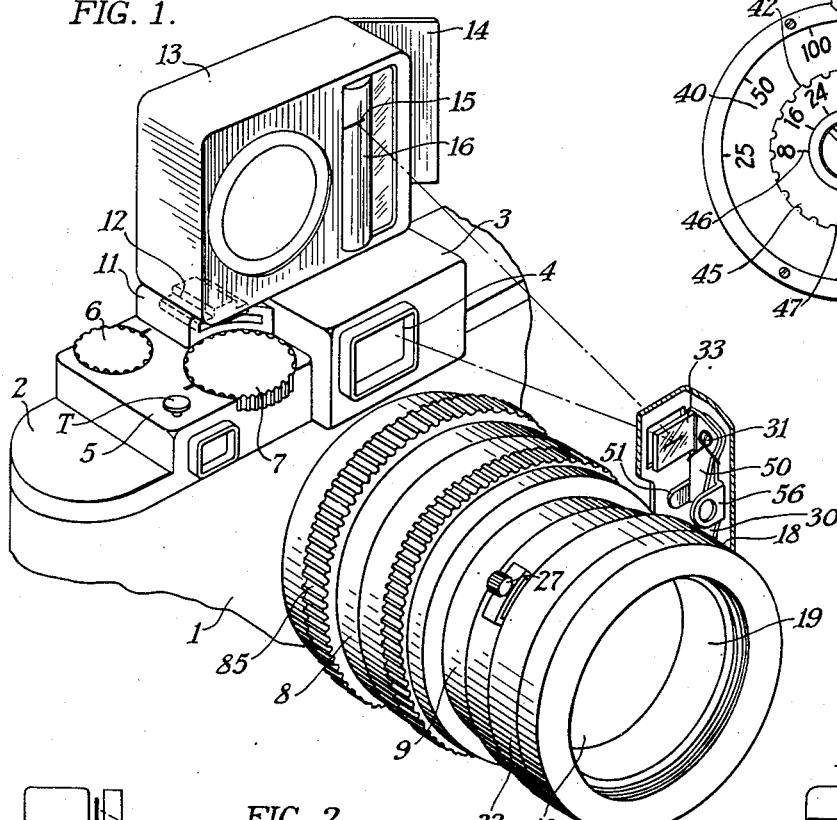
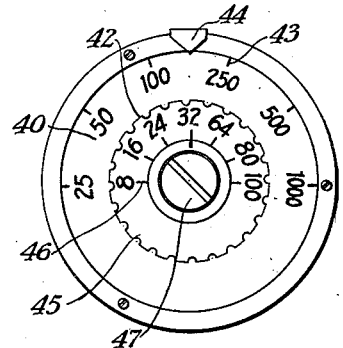
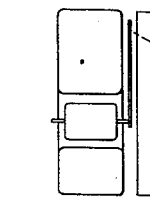
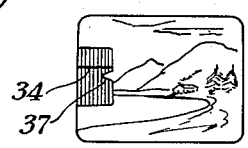
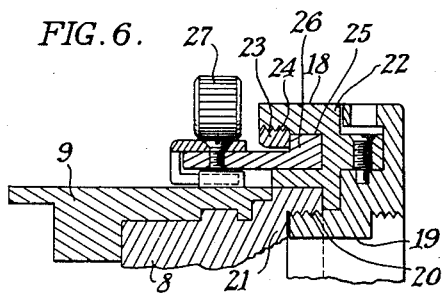
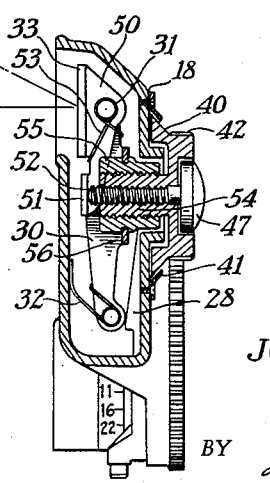
JOSEPH MIHALYI
INVENTOR
ATTORNEYS

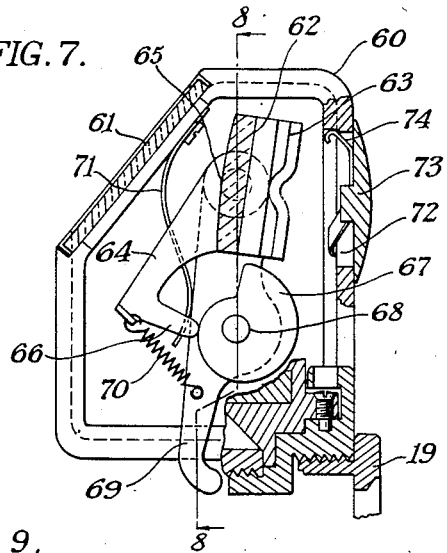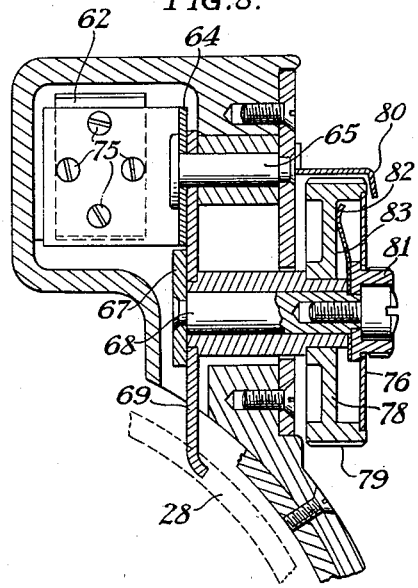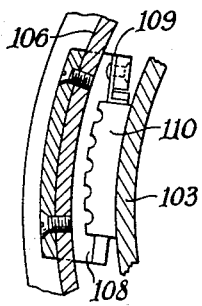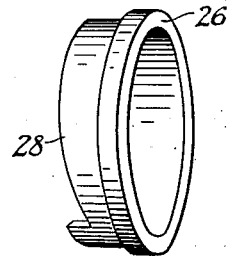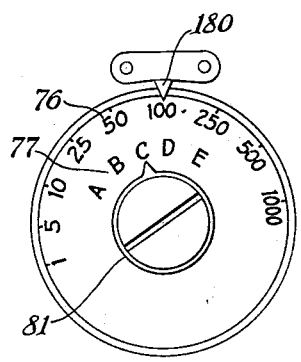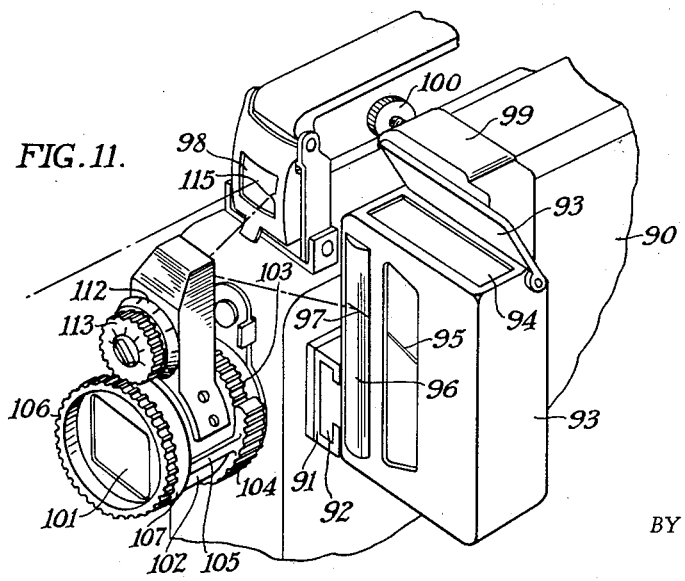

Patented Oct. 10, 1944

2,360,256

UNITED STATES PATENT OFFICE 2,360,256

EXPOSURE CONTROLLING MECHANISM FOR CAMERAS

Joseph Mihalyi, Rochester, N. Y., assignor to Eastman Kodak Company, Rochester, N. Y., a corporation of New Jersey Application June 6, 1942, Serial No. 446,047

10 Claims. (Cl. 95—10)

This invention relates to photography and more particularly to photographic cameras having a novel type of exposure control. One object of my invention is to provide an exposure control mechanism for cameras which does not require any material changes of the standard camera structures. Another object of my invention is to provide an exposure control attachment which can be added to cameras now on the market. Still another object of my invention is to provide an exposure control mechanism which can be applied to cameras and in which the regular camera finder may include a means for determining the proper setting of the camera for a given set of light conditions. Other objects will appear from the following specification, the novel features being particularly pointed out in the claims at the end thereof.

A great many devices have been designed by which a camera may be automatically set to predetermined light conditions, the light being measured by a light sensitive meter, the reading of which is utilized either directly or indirectly to set the camera to produce the required exposure. Such mechanisms are usually of a type which requires a special camera to be built with the light measuring mechanism included in the structure of the camera itself. While such mechanisms are satisfactory from the standpoint of obtaining the proper exposure, they are ordinarily extremely costly largely because it is necessary to produce a special camera body and lens equipment to take care of the light measuring mechanism.

One of the objects of my invention is to provide a camera in which the proper exposure may be determined with the aid of a light meter, but which does not require an especially built camera body and which may even be provided as an attachment for cameras now on the market without sacrificing the efficiency of the mechanism. To accomplish this I provide parts which may be attached to standard cameras in such a manner as to turn the camera into a semi-automatic exposure control mechanism.

Coming now to the drawings wherein like reference characters denote like parts throughout:

Fig. 1 is a perspective view partially broken away and partially shown in section illustrating a camera of a standard type equipped with an improved exposure control mechanism constructed in accordance with and embodying a preferred form of my invention;

Fig. 2 is a fragmentary sectional view of portions of the exposure determining mechanism shown in Fig. 1;

Fig. 3 is a side detail elevation on an enlarged scale of one form of a pivotal and adjustable supporting arm for a mirror;

Fig. 4 is an enlarged front plan view of a portion of the mirror adjusting mechanism;

Fig. 5 indicates the field of view which may be seen through the camera finder and includes the exposure indicating devices;

Fig. 6 is an enlarged fragmentary view in section showing a portion of the lens support attachment;

Fig. 7 is an enlarged fragmentary view partially in section showing a mirror adjusting mechanism constructed in accordance with a second embodiment of my invention;

Fig. 8 is an enlarged fragmentary section taken on line 8—8 of Fig. 7;

Fig. 9 is a fragmentary detail section showing a connection between the lens attachment and the diaphragm operating ring;

Fig. 10 is a perspective view of a ring cam used in connection with an embodiment of my invention;

Fig. 11 is a fragmentary perspective view of a second embodiment of my invention applied to a known type of motion picture camera; and Fig. 12 is a fragmentary front plan view of the mirror adjusting mechanism shown in Fig. 8.

My invention comprises broadly providing an automatic exposure indicating apparatus which can be either permanently attached to or temporarily attached to standard cameras now on the market. If desired, of course, the exposure determining means may be built into a camera, but one of the primary objects of my invention is to provide an exposure controlling apparatus which does not need to be built into a camera.

In a preferred embodiment of my invention the attachment may consist of two parts; one part, a light-sensitive cell and meter which may detachably engage a portion of the camera body, and a second part including an adjustable mirror which may be attached to a standard form of objective in which there is the usual type of adjustable diaphragm. These two parts may constitute the complete exposure indicating and controlling apparatus, since the mirror may be used to reflect a pointer image indicating the light conditions into a portion of the view finder, so that when the pointer is brought opposite to a suitable pointer inscribed in the view finder the operator will know that the camera shutter and diaphragm are both properly set for the prevailing light conditions and for the particular type of film with which the camera is loaded.

Referring to Fig. 1, the exposure indicating device may be applied to a standard type of camera including a camera body 1 having a top wall 2, the central portion of which 3 is formed upwardly to enclose a finder of a known type 4 for indicating the field of view. The upper wall includes a housing 5 and shutter speed dials 6 and 7 mounted on the top wall of housing 5 graduated into units of shutter speeds. The particular shutter used is unimportant but it may be of the type shown in my Patent No. 2,203,657 for Curtain shutter, granted June 4, 1940. Since the shutter mechanism is fully disclosed in this patent and since it forms no part of the present invention it need not be further described.

On the front wall of the camera body 7 there is mounted an objective 8 which is provided with the usual diaphragm adjusting ring 9 by which the aperture of the objective, the front element of which 10 is shown in Fig. 1, may be adjusted.

The housing 5 preferably includes a track or slideway 11 into which a shoe 12 may slide to support a light-sensitive cell and light meter 13. This cell may be of the usual type and may have a reflector 14 for directing light from the direction in which the camera is pointing to the light-sensitive element. Inside of the meter 13 there is preferably arranged an adjustable meter arm 15 which moves in accordance with the light falling on the light-sensitive cell. This meter arm is positioned behind a cylindrical lens 16 at the focal point thereof so that it will always appear as a straight line 15 as it moves beneath the straight cylindrical lens 16. This feature is shown in my copending application Serial No. 461,213, filed October 7, 1942, for Light meter camera. This light meter consists of one section of my attachment for indicating the proper exposure and, since it is a single unit and has a slidable connection with the camera, it may readily be placed on standard cameras. Brackets or slideways 11 are well known for supporting various camera attachments in cameras of the type described.

The second portion of my camera attachment consists of a ring-like support 18 which may, as indicated in Fig. 6, consist of an annular member 19 threaded at 20 to screw into the end 21 of a standard camera objective 8. The ring-like member 19 is formed in two parts, the second part 22 being annular in shape and including a ring 23 threaded to the ring 22 at 24. This leaves an annular groove 25 in which the annular ring 26 may turn, this ring constituting a cam ring since it carries a cam for altering the position of a mirror as will be hereinafter more fully described. The ring 26 with its cam is adapted to rotate when the handle 27 of the objective diaphragm ring 9 is turned and consequently, as the diaphragm ring moves, a cam carried by the ring 26 moves, this cam 28 indicated in Figs. 2 and 10 operating a lever arm 30 pivoted at 31 to the support 18 as shown in Fig. 2. A spring 32 normally holds the end of lever 30 against cam 28 so that as the cam moves the mirror 33 likewise moves about the pivot 31.

The mirror 33 is so positioned that an image designated in Fig. 5 as 34 will be reflected into the front lens 35 of a view finder which includes the eyepiece 36. The front lens 35 is also provided with a pointer 37 as shown in Fig. 5. Thus the mirror 33 reflects an image of the meter pointer 15 into the view finder and, by turning the diaphragm ring 9, this image 34 may be brought into alignment with the pointer 37, thus indicating that the setting of the diaphragm is correct for the prevailing light conditions.

It is necessary to take into consideration the speed of the shutter for the particular exposure to be made, and to accomplish this I provide a setting member shown broadly in Fig. 4 as 40. This operates in the following manner. The dial 40 turns beneath an upturned ring 41 which is spaced therefrom and which is carried by the support 18. The dial may be turned by the knurled edge 42 so that the desired graduation 43 indicating shutter speeds may be brought opposite a pointer 44. If the shutter is set for 1/250 of a second the dial 42 should be similarly set. The lever 30 moves only through a small angle about its pivot 31 and consequently only a little clearance is required between the dial 40 and the ring 41 to permit such movement. The dial 40 and the screw 52 are both carried by the threaded nut 55 supported by the flanges 56 forming a part of lever 30 as will be hereinafter more fully described.

It is usually desirable to compensate for film of various speeds and to accomplish this I provide an inner dial 45 graduated into units 46 of film speed. A pointer is movable over this dial being movable by means of the flanged member 47. Usually it is only necessary to set the flange 47 once each time a film is loaded into the camera and it may remain set until a different speed of film is used.

In order to transmit motion from the dial 42 and from the flanged member 47 to the mirror 33 the following structure is used. The mirror 33 is fixedly mounted upon a lever 50 which may turn upon the stud 31, this lever 50 including a flange 51 lying in the path of the screw 52, this screw terminating in the setting member 47. Thus, if this screw is moved in or out, the lever 50 will be correspondingly moved without, however, moving the lever 30 because a spring 53 tends to turn the lever 50 in a counter-clockwise direction with reference to Fig. 2. If the dial member 40 is turned, the threaded connection 53 between the hollow shaft 54 and the screw-threaded member 55 causes the screw 52 to again move lever 50 through its contact with the flange 51 since the threaded member 55 is a nut carried by the flange 56 of the lever 30. Thus, by turning either the dial 45 or the flanged setting member 47 to adjust for shutter speed or for film speed, the mirror 33 is deflected a suitable amount to alter the position of the image 34 of the meter pointer 15 in the finder and thus compensate for the settings of these members.

After this device has been mounted on the camera shown in Fig. 1, it can be readily used as a unit and the operation is extremely simple. The operator, in making an exposure, may adjust the dials 6 and 7 to the desired shutter speed and after setting the speed dial 45 to the selected shutter speed may then glance through the eyepiece 36 to look at the view in the finder 35. If he should see that the image 34 of the meter pointer 15 is out of alignment with the pointer 37 of the finder, as indicated in Fig. 5, he may then grasp the handle 27 and adjust his objective diaphragm ring 9. This can be moved until the image 34 and the pointer 37 come in register which they will do because the cam ring 28 is moved with the diaphragm ring 9 when handle 27 is turned, thus altering the inclination of the mirror 33. As soon as the image 34 and the pointer 37 are in register an exposure may be made by depressing the shutter trigger T. Thus, the operation is extremely simple and can be carried out in less time than it takes to describe this operation.

Another embodiment of my invention may provide a different form of mirror adjusting mechanism as shown in Figs. 7 and 8. In this instance the housing 60 which may be attached to the objective through the annular ring 19 described above may contain a window 61 which may be covered with glass. In this instance the mirror 62 is carried by a bracket 63 supported by the arm 64 pivoted at 65 to the support and having an end 66 engaging the cam 67 mounted to turn upon a stud 68 carried on the lever arm 69. A spring 70 holds the lever 66 against the cam 67 and a second spring 71 turns the lever arm 69 into engagement with the cam 28 shown in Fig. 10. In this instance the cam ring 26 may be attached to the objective diaphragm as indicated in Fig. 6. The support 60 may also be provided with an opening 72 covered by the cap 73 and held in place by a spring 74, this opening being useful for initially setting up the mirror 62 and accurately aligning it with a plurality of screws 75 as shown in Fig. 8. In this form of the invention the shutter speed compensating member is a dial 76 graduated into units of shutter speed and there is also a second dial 77 graduated into units of film speed. Normally, dial 76 which is carried by the wheel 78 turns with the shaft 68 carrying the cam 67 so that when the knurled ring 79 is turned, the speed dial 76 may be adjusted to the proper position as indicated by the pointer 80. This movement turns the cam 67 and adjusts the mirror 62. However, it is possible to turn the shaft 68 without turning the shutter speed dial 76 and this may be done by holding the knurled wheel 79 and turning the knurled wheel 81, thus permitting the spring 82 to slip on the surface 83 of the wheel 78.

It will be seen that in both of my embodiments it is only necessary to adjust the mirror to compensate for either the speed of a particular film used, or the speed at which the shutter is set. In both my embodiments, it is then only necessary to match the image 34 with the pointer 37 to correctly set the camera to give the proper exposure for the prevailing light conditions.

It should be noted that when the camera objective is focused on near-by objects, as for instance by turning the focusing ring 85 of Fig. 1, the objective moves farther from the camera body than when the camera is focused on distant objects. This is desirable because it changes the relative position between the mirror 30 and both the meter needle and the view finder and this change is in a direction to give additional exposure to nearby objects which is of course required.

If it is desired to apply my invention to a motion picture camera, this can be carried out in the manner shown in Fig. 11. As indicated in this figure, a motion picture camera 90 may be equipped with a bracket 91 into which the foot 92 of a light-sensitive cell and meter 93 may slide to hold this member against the side of the camera. As in the first embodiment a reflector 93 may be used to reflect light rays to the light-sensitive element 94 and when this takes place a meter arm 95 may move so that the cylindrical lens 96 may form a straight line image 97 of the pointer in a position to be reflected into the front element 98 of a camera finder which may be of known type. If necessary a clamp 99 with a screw 100 may be used to hold the light-sensitive meter 94 in a fixed position.

The camera is provided with an objective 101 mounted in a lens barrel 102 and having a diaphragm adjusting ring 103. This ring may engage an adjusting member 104 connected by arms 105 to the ring 106 which carries a cam 107, this cam adjusting the mirror as indicated in Figs. 7 and 8. The ring 106 carrying the cam may be provided with a fixed stop 108 and a movable stop 109 to engage a lug 110 on the diaphragm adjusting ring 103 so that these parts may move together. Since most motion picture cameras have comparatively few shutter speeds, the dial 112 may only bear the necessary graduations which are usually for speeds given at 8, 16, 32, and occasionally 64 frames per second. The dial 113 may be graduated into units of the different film speeds used in motion picture cameras.

With this embodiment of my invention, like the first described embodiment, an operator first selects the number of exposures he is to make per second setting this on dial 112, and then selects the speed of the film which he is using and sets dial 113. It is then only necessary for him to look through the direct view finder in the usual manner and, as soon as the images of the meter arm 97 and a pointer 115 in the finder are brought into registration by turning the diaphragm handle 104, the camera will be properly adjusted for the existing light conditions.

It is obvious that some changes will be necessary as indicated above for cameras of different types, but it is a comparatively simple matter to design a device for determining exposure to go on most if not all known types of cameras. Such mechanism can readily be built into cameras where required, but this of course adds greatly to the expense of such exposure determining mechanism. Since, obviously, my invention may take many different forms when applied to different cameras I consider as within the scope of my invention all such forms as may come within the scope of the appended claims.

What I claim as new and desire to secure by Letters Patent of the United States is:

1. In an exposure controlling device for cameras of the type including an objective, an adjustable diaphragm, a variable speed shutter and a view finder, the combination with a light-sensitive cell, of means for determining and indicating light conditions including a movable light indicator, optical means mounted thereover for producing an image of said indicator movable in a straight line, a support carried by the objective, a pivoted arm carried by the support, a mirror carried by the arm for reflecting the image of the movable light indicator to the view finder, a pointer carried by the view finder with which said image may be registered, and means operably attached to the adjustable diaphragm for moving the mirror carrying arm.

2. In an exposure controlling device for cameras of the type including an objective, an adjustable diaphragm, a variable speed shutter and a view finder, the combination with a light-sensitive cell, of means for determining and indicating light conditions including a movable light indicator, optical means mounted thereover for producing an image of said indicator movable in a straight line, a support carried by the objective, a pivoted arm carried by the support, a mirror carried by the arm for reflecting the image of the movable light indicator to the view finder, a pointer carried by the view finder with which said image may be registered, means operably attached to the adjustable diaphragm for moving the mirror carrying arm, and means for deflecting said mirror relative to said arm.

3. In an exposure controlling device for cameras of the type including an objective, an adjustable diaphragm, a variable speed shutter and a view finder, the combination with a light-sensitive cell, of means for determining and indicating light conditions including a movable light indicator, optical means mounted thereover for producing an image of said indicator movable in a straight line, a support carried by the objective, a pivoted arm carried by the support, a mirror carried by the arm for reflecting the image of the movable light indicator to the view finder, a pointer carried by the view finder with which said image may be registered, means operably attached to the adjustable diaphragm for moving the mirror carrying arm, a pivotal support on the arm for said mirror, and means graduated into units of shutter speed for adjusting said mirror on said pivotal support carried by the arm.

4. An attachment for cameras of the type including an objective, an adjustable diaphragm therein, a variable speed shutter, and a view finder for automatically determining exposure comprising, in combination, a light-sensitive cell adapted to be attached to a camera body, a meter pointer carried by the cell, a straight line scale, optical means for providing a straight line image of the meter pointer at right angles to the length of the straight line scale, a support adapted to be attached to the objective of the camera, a pivoted mirror carried thereby and positioned to reflect the straight line image of the pointer to the view finder, a pointer in the view finder, means for moving the mirror carried by the support for deflecting the image of the meter pointer into registration with the pointer in the view finder and connections between said means and the adjustable diaphragm of the camera objective, whereby adjustment of the diaphragm may deflect the mirror.

5. An attachment for cameras of the type including an objective, an adjustable diaphragm therein, a variable speed shutter, and a view finder for automatically determining exposure comprising, in combination, a light-sensitive cell adapted to be attached to a camera body, a meter pointer carried by the cell, a straight line scale, optical means for providing a straight line image of the meter pointer at right angles to the length of the straight line scale, a support adapted to be attached to the objective of the camera, a pivoted mirror carried thereby and positioned to reflect the straight line image of the pointer to the view finder, a pointer in the view finder against which an image of the meter pointer may be registered, means for moving the mirror carried by the support, connections between said means and the adjustable diaphragm of the camera objective, whereby adjustment of the diaphragm may deflect the mirror, and means independent of the diaphragm for adjusting the mirror to compensate for the exposure time of the variable speed shutter.

6. For use with exposure apparatus to be carried by a flanged camera objective including an adjustable diaphragm with a diaphragm adjusting member, a support, a clamping member for attaching the support to the flanged camera objective, a cam movably carried by the support, means for attaching the cam to the diaphragm adjusting member, a pivoted lever carried by the support and contacting said cam to be operated thereby, and a mirror adjustably mounted on said pivotal arm.

7. For use with exposure apparatus to be carried by a flanged camera objective including an adjustable diaphragm with a diaphragm adjusting member, a support, a clamping member for attaching the support to the flanged camera objective, a cam movably carried by the support, means for attaching the cam to the diaphragm adjusting member, a pivoted lever carried by the support and contacting said cam to be operated thereby, a second lever movably carried by the first pivoted lever, a mirror carried by the second lever, and a manually operable member graduated into units of exposure and movably engaging the second lever for moving the mirror independently of the cam.

8. For use with exposure apparatus to be carried by a flanged camera objective including an adjustable diaphragm with a diaphragm adjusting member, a support, a clamping member for attaching the support to the flanged camera objective, a cam movably carried by the support, means for attaching the cam to the diaphragm adjusting member, a pivoted lever carried by the support and contacting said cam to be operated thereby, a mirror, an adjustable mount for said mirror carried on said pivotal arm, and two manually operable members operatively engaging the adjustable mount for said mirror for moving the mirror independently of the cam, one manually operable member being graduated into units of exposure and the other manually operable member being movable over a scale graduated into units of film speed.

9. For use with exposure control apparatus, a support to be carried by a camera of the type including an objective having an adjustable diaphragm, a mirror, a pivoted lever carrying the mirror and mounted upon the support, a cam movably mounted on the support, means for connecting the cam to the diaphragm to move therewith to deflect the mirror as the diaphragm is moved, said pivoted lever engaging said cam, and carrying a second lever movable relative thereto, a nut carried by the first-mentioned pivoted lever, a hollow screw engaging the nut and having an interior thread, a screw contacting with the interior thread of the hollow screw to vary the angular relation between the mirror and the levers when either the hollow screw or the screw is turned.

10. For use with exposure control apparatus, a support to be carried by a camera objective of the type including an adjustable diaphragm in a lens barrel, a mirror, a pivoted lever carrying the mirror mounted upon the support, a cam rotatably mounted on the support, said cam contacting with the pivoted lever, and means for connecting the cam to the diaphragm for deflecting the mirror as the diaphragm is moved and means carried by the support for clamping said support upon the lens barrel.

JOSEPH MIHALYI.